June 16, 1959  L. F. HAMBLIN  2,890,894
STEERING OR TRAILER VEHICLES
Filed Dec. 4, 1956  4 Sheets-Sheet 1

INVENTOR
LESLIE FRANK HAMBLIN
by Walter S. Pleston
ATTORNEY

June 16, 1959  L. F. HAMBLIN  2,890,894
STEERING OR TRAILER VEHICLES
Filed Dec. 4, 1956  4 Sheets-Sheet 2
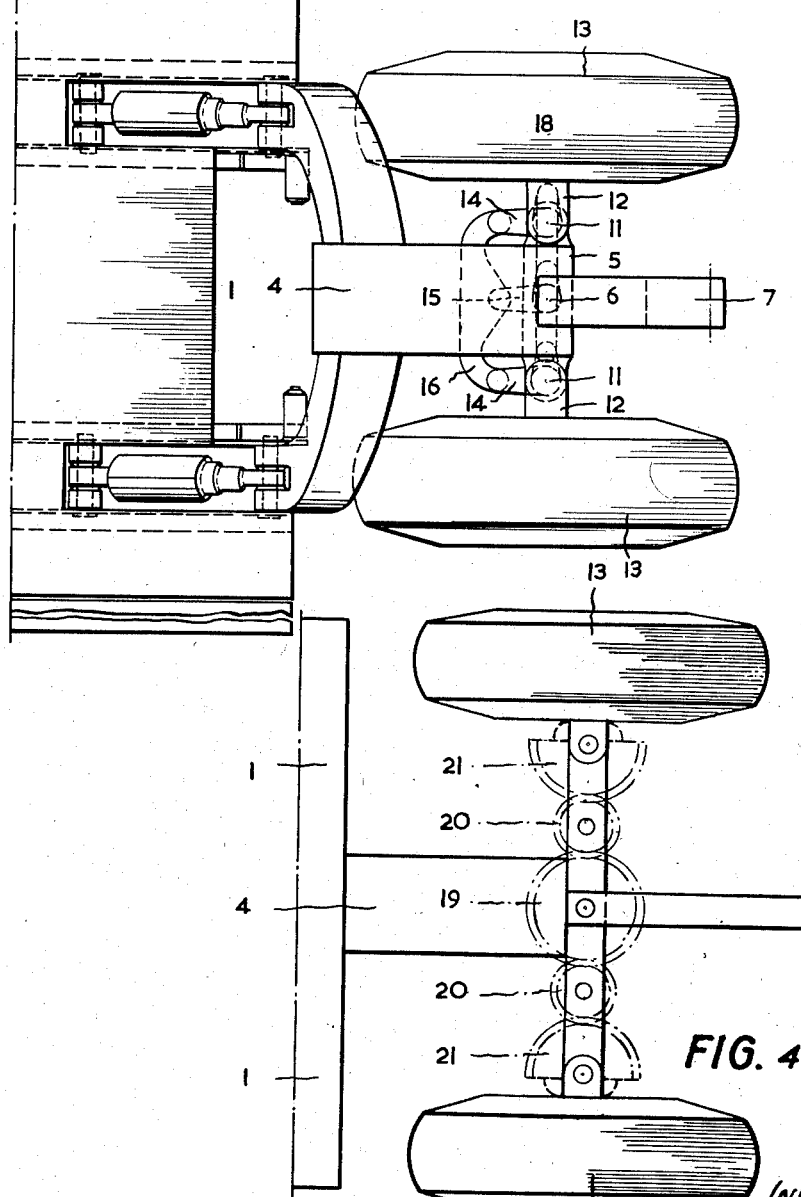
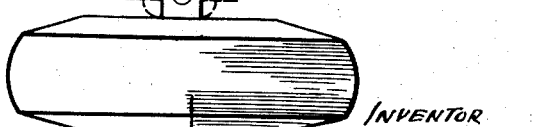
INVENTOR
LESLIE FRANK HAMBLIN
ATTORNEY

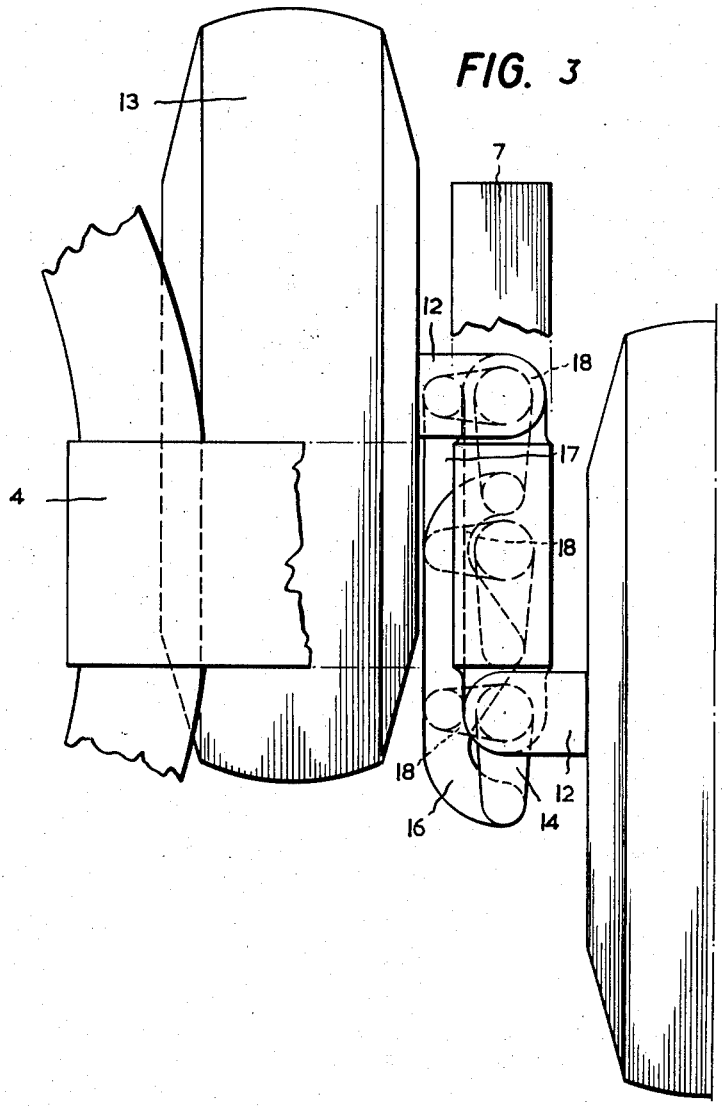

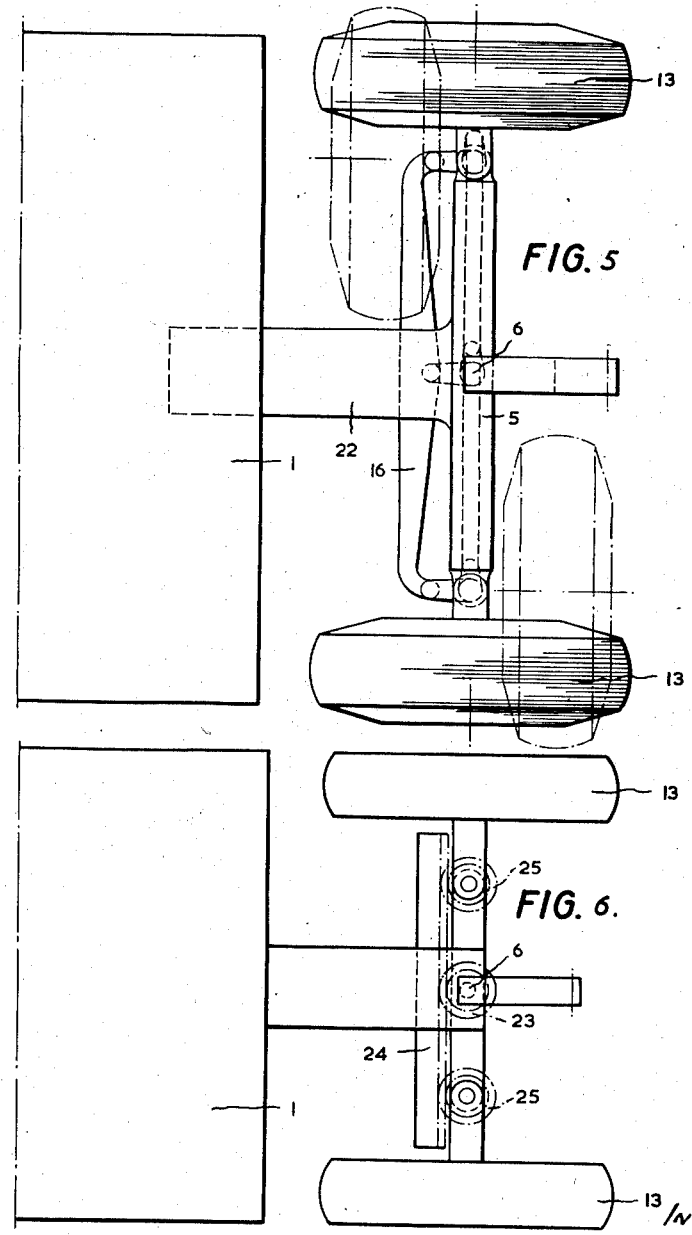

United States Patent Office

2,890,894
Patented June 16, 1959

---

2,890,894

STEERING OF TRAILER VEHICLES

Leslie Frank Hamblin, Marchamley, near Shrewsbury, England, assignor to Sentinel (Shrewsbury) Limited, Shrewsbury, England, a British company Application December 4, 1956, Serial No. 626,132

Claims priority, application Great Britain December 7, 1955

3 Claims. (Cl. 280—103)

This invention relates to the steering of trailer vehicles having more than one axle. It is particularly, though not exclusively, concerned with low-loader trailers of the kind having a long low platform in the middle and steered at the front.

Where the wheelbase of the trailer is considerably longer than that of the towing vehicle the turning circle of the combination is largely determined by the lock of the steered wheels of the trailer. It is common practice, therefore, to mount the front axle of the trailer on a single central kingpost, so that the whole axle assembly turns, the front end of the trailer being provided with a suitable swan-neck, to allow clearance for the wheels on full lock. The tow bar is attached to the axle itself to turn the axle as the towing vehicle turns. In this way it is possible to allow a full ninety degree lock on the front wheels of the trailer in each direction, so that the minimum turning circle of the combined trailer and towing vehicle is equal to or only a shade greater than the overall length of the trailer. The disadvantage of this pivoting axle is, however, that it reduces the stability of the trailer from that of a four-wheeled to that of a three-wheeled vehicle. This is a serious disadvantage where cross country work or sharp turns on cambered roads are envisaged.

Accordingly it is known to use a straight-forward Ackermann linkage for the front wheels with a conventional track rod, but hitherto this has very seriously limited the lock obtainable.

According to the present invention it is proposed to provide a trailer vehicle having steerable front wheels carried on separate pivot pins and steered by the towing member of the trailer, in which the linkage connecting the towing member to the wheels and the lateral offset of the pivot pins from their respective wheels are such, in relation to the disposition of the front end assembly of the vehicle, as to allow a full ninety degree lock in either direction.

This may be achieved in one of a number of ways. The pivot pins for the two wheels may be carried on the ends of a rigid transverse axle beam in the manner of a straightforward Ackermann linkage, but are set well inboard of the plane defined by the inboard surfaces of the tires, so that each stub axle can pivot about its king pin through a full ninety degrees each way without the wheel fouling the axle. A rigid beam track rod, i.e. one able to take bending as well as tensile and compressive stresses, is pivotally connected between leading or trailing steering arms on the two stub axles, and at its mid-point is pivoted to a third arm pivoted at the mid-point of the axle and actuated by the trailer tow bar. This arm may in fact be part of the tow bar or an extension of it, the tow bar itself then being pivoted at the mid-point of the axle.

It will be appreciated that the geometry of this arrangement is such that the track rod exerts a positive turning couple about each king pin even at the full lock positions, and there is no question of a "top dead center" position arising. Furthermore, the leverage exerted is that of the tow bar itself which will be several times the length of the stub axle steering arms. This adequately overcomes any stiffness in the steering that may arise through the inboard position of the king pins.

When the wheels are on full lock the plane of one wheel will lie wholly behind and parallel to the axle and that of the other wheel will lie wholly in front of and parallel to the axle. The tow bar will lie above or below the axle in the same vertical plane, and will still not foul either of the wheels. Both the axle and the towing bar lie between the planes of the wheels.

To prevent directional instability at or near full lock it may be necessary to provide an auxiliary track rod connected between arms on the stub axles at an angle to the main steering arms.

In another form of steering according to the invention, actuation is by a rack moved by a pinion turning with or forming part of the tow bar, and engaging pinions or segments turning the stub axles about their pivot pins.

In the layouts described, the wheels remain parallel to one another at all times, so they do not represent true Ackermann systems.

In another way of carrying out the invention, toothed segments turning about the king pins and rigid with the stub axles both engage a common pinion at the mid-point of the axle, and this pinion is rotated by a segment secured to the tow bar. By making the gearing in this case elliptical or eccentric it is possible to achieve a true Ackermann geometry with the axes of the front wheels at all times intersecting substantially on the common axis of the rear wheels.

There are many possible modifications in the arrangements described, all of which would achieve the same result. For example, in the last of the three, the central pinion could be directly connected to the tow bar and then is separated from the segments on the king pins by intermediate idlers so that the rotation of the stub axles is in the correct direction with movement of the tow bar.

The essential thing about all of the possible arrangements is that they allow the wheels to be carried on separate kind pins, giving four-wheel stability, whilst still permitting ninety degrees lock in each direction.

The fixed axle carrying the king pins may be secured to the trailer in any convenient way. For example, it could be held by a central non-rotating king post carried on a swan-neck, with the tow bar carried by a bracket pivoted to the top and bottom ends of the kind post. This is particularly suitable where it is desired to be able to transfer at will part of the weight of the front of the trailer onto the rear axle of the towing vehicle.

Examples of trailer vehicles having front wheel steering arrangements according to the invention will now be described with reference to the accompanying drawings, in which:

Figure 2 is a plan view to a larger scale of the front end of the trailer;

Figure 3 is a similar view but to a still larger scale, and with the front wheels on full left lock;

Figures 4, 5 and 6 are plan views of the front ends of trailers embodying modified forms of steering according to the invention.

Figure 1:
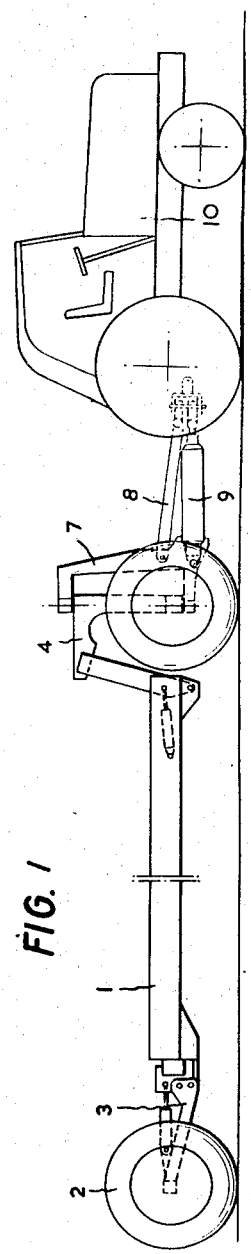
Figure 1 is a side elevation of the trailer in position behind a tractor and ready for towing.

Referring first to Figures 1 to 3, a trailer comprising a long low-loading platform 1 supported at the rear on wheels 2 carried on trailing links 3 and at the front on a swan-neck structure 4 which carries at its lower end a transverse beam 5 forming a rigid front axle. The arrangement of the trailing links 3 and the structure 4 in relation to the platform form the subject of our co-pending U.S. patent application No. 626,131, filed Dec. 4, 1956.

A vertical pivot pin 6 extends through the center of the axle beam 5, and through the front part of the swan-neck structure 4. A yoke 7 is pivoted to the top and bottom ends of the pin 6 and forms part of a towing bar in combination with members 8 and 9 by means of which it can be connected to a tractor 10.

At the two ends of the axle beam 5 there are vertical pivot pins 11 carrying respective stub axles 12 on which the front wheels 13 are freely mounted for rotation. Short trailing arms 14 are mounted rigidly on the stub axles 12 and extend rearwards. A similar arm 15 forms a rearward extension of the lower end of the towing bar yoke 7. The free ends of these three arms are in line and are pivotally connected to a rigid one-piece track rod 16. It will be seen that the track or tie rod 16 is shaped to resist bending moments as well as to transmit tensile and compressive forces. It will in addition be noted that the track rod is shaped so that in the full lock position shown in Figure 3 it clears the pivotal axis 6.

Movement of the towing bar about the axis 6 as the tractor turns to the left or the right positively moves the track rod 16 laterally to turn the front wheels 13 of the trailer about their pivot pins and thus to cause the trailer to follow the tractor. As the rearwardly extending part of the swan-neck structure 4 lies above the level of the wheels 13, the wheel on the inside of the turn can pass under this part and the wheels are thus permitted to make a full ninety degree turn as shown in Figure 3. This is furthermore permitted by the fact that the pivot pins 11 are outside the planes of their respectively wheels so that on full lock there is a space between the planes of the two wheels accommodating the front axle and through which the towing bar can extend.

As the towing bar assembly 7, 8 and 9 is several times the length of the individual steering arms 14 and is rigid with the arm 15, then even at full lock there is a powerful turning moment applied to the stub axles 12 by the towing bar and this adequately overcomes any stiffness that may arise through the fact that the pivot pins 11 are set well inboard of the planes of the wheels. In contrast to the normal known track rod arrangement, there is no question of a "dead center" position arising on large locks.

With only a single track rod 16, small amounts of wear in the pivots joining the track rod to the arms 14 and 15 may give rise to relatively large angular movements of the stub axles 12 when the steering is on full lock, with these pivots in line with the pivot pins 11. To prevent this there is conveniently an auxiliary track rod 17 carried on arms displaced through ninety degrees with respect to the arms 14 and 15. These arms are indicated at 18 and it will be seen that when the arms 14 and 15 are parallel with the track rod 16, these arms 18 are at right angles to the auxiliary rod 17 and resist any tendency to play.

With the arrangement shown in Figures 1 to 3, in which there is a swan-neck structure under which the wheel on the inside of the turn can pass, it is possible to use very large tires while still keeping within strict legal limits on overall width of the trailer. In fact, it will be seen that the length of the axle between the pivot pins 11 is less than the overall diameter of the wheels.

This is also true of the arrangement shown diagrammatically in Figure 4, in which the towing bar acts on the stub axles through a pinion 19 which, through idlers 20, act on gear segments 21 secured to the stub axles 12. As in the arrangement described earlier, the towing bar is pivoted substantially at the mid-point of a straight line joining the two pivot pins 11, so that on full ninety degree lock in either direction when the planes of the wheels 13 are parallel the towing bar extends between these two planes and thus cannot foul the wheels.

Figure 5 shows an arrangement suitable for use where there is no limitation on overall width of the vehicle. Here the front end of the vehicle, instead of having a swan-neck structure, simply has a horizontal forward extension 22 carrying a relatively long transverse beam axle 5 and the inner wheel on a turn can be accommodated between the axle and the main platform 1 of the trailer, as indicated in broken lines.

In Figure 6 is shown diagrammatically a further possible arrangement for actuating the steering of the wheels from the towing bar. Here a pinion 23 on the pivotal axis of the bar and turning with the bar moves a rack 24 which in its turn engages pinions or segments 25 secured to the stub axles.

In all the arrangements according to the invention the axes of the pivot pins are spaced inwards from the planes of the inner walls of the corresponding wheels sufficiently so that on full ninety degree lock in either direction there is a gap between these planes of the two wheels through which the towing bar can extend, and which also allows room for the rigid front axle.

While in all the arrangements shown the axes of the wheels 13 remain parallel at all steering angles, it will be understood that the invention may also be used with a linkage which gives true Ackermann steering, that is to say, where the axes of the front wheels intersect substantially on the common axis of the rear wheels.

I claim:

1. A trailer vehicle comprising a load-carrying platform, rear supporting wheels, a rigid transverse front axle secured to the front end of said platform with, however, a clearance between said axle and said front of said platform, first and second pivot pins, said pivot pins being carried on the ends of said axles, first and second stub axles steerably mounted respectively on said pivot pins, first and second front wheels mounted respectively for rotation on said stub axles, a towing member, said member being secured to the vehicle for angular movement about a substantially vertical axis mid-way between said pivot pins, each of said stub axles and said towing member including parts secured to said stub axles and said towing member, respectively, said parts being of the same radial length and extending parallel to each other, said parts being endwise interconnected so that said towing member when turning about said vertical axis is permanently parallel to the planes of said wheels, said pivot pins being offset inboard from their respective wheels to allow full ninety degree steering of the front wheels by the towing member in either direction whereby the one or the other one of said wheels will enter said clearance.

2. A trailer vehicle comprising a load-carrying platform, rear supporting wheels, a rigid transverse front axle secured to said platform and having two ends, first and second substantially vertical pivot pins on the ends of said axle, first and second stub axles, said stub axles being pivotally mounted respectively on said pivot pins, front supporting wheels rotatably mounted on said stub axles, a towing member, a pivotal connection between said towing member and said vehicle on a substantially vertical axis, said axis passing substantially through the mid-point of a line joining said pivot pins, first and second arms rigid with said first and second stub axles and pointing in a horizontal plane at right angles to said stub axles, first and second pivotal points on the free ends of said arms respectively, a third pivotal point on said towing member, a track rod having an axis running generally transverse to the vehicle, portions of said track rod extending horizontally out of the line of said axis to leave re-entrant gaps between said portions, and pivotal connections between said portions and said first, second and third pivotal points respectively, whereby on a full ninety degree turn said pivotal points can come to lie on a line joining said pivot pins.

3. A trailer vehicle comprising a load carrying platform, rear supporting wheels, a rigid transverse front axle secured to the front end of the platform with, however, a clearance between said axle and said front of said platform, first and second pivot pins carried on the ends of said axle, first and second stub axles steerably mounted respectively on said pivot pins, first and second front wheels mounted respectively for rotation on said stub axles, said pivot pins being offset inboard from their respective wheels to allow full ninety degree steering of the front wheels whereby the one or the other one of said wheels will enter said clearance, a towing member secured to the vehicle for angular movement about a substantially vertical axis midway between said pivot pins, a linkage connecting said towing member with said stub axles whereby to cause said stub axle to turn about their respective pivot pins in accordance with angular movements of said towing member, said linkage comprising first and second arms rigid with said first and second stub axles, respectively, a pivotal point on said towing member, a first rigid track rod having a pivotal connection with said arms and said point and being shaped to clear the pivotal axis of said towing member on a ninety degree turn, and a second track rod pivotally associated with said stub axles at points displaced angularly from the pivotal connections of said first mentioned track rod.

References Cited in the file of this patent

UNITED STATES PATENTS

| | | |
|---|---|---|
| 724,149 | Whalley | Mar. 31, 1903 |
| 1,522,706 | Allen | Jan. 13, 1925 |
| 1,812,768 | Berggren | June 30, 1931 |
| 2,107,384 | McQueen | Feb. 8, 1938 |
| 2,719,727 | Wirtwer | Oct. 4, 1955 |

FOREIGN PATENTS

| | | |
|---|---|---|
| 151,819 | Australia | June 10, 1953 |
| 268,909 | Germany | Jan. 2, 1914 |
| 805,958 | Germany | June 11, 1951 |